United States Patent [19]
Raquel

[11] 4,090,651
[45] May 23, 1978

[54] FISH STRINGER

[76] Inventor: Edward M. Raquel, 22500 33 Mile Rd., Armada, Mich. 48005

[21] Appl. No.: 693,015

[22] Filed: Jun. 4, 1976

[51] Int. Cl.² ........................................ A01K 65/00
[52] U.S. Cl. ................................ 224/7 E; 224/45 P
[58] Field of Search ............... 43/4, 4.5, 6.5, 54.5 R; 224/7 A, 7 B, 7 D, 7 E, 7 R, 45 F, 45 P, 55

[56] References Cited
U.S. PATENT DOCUMENTS

| | | | |
|---|---|---|---|
| 1,927,920 | 9/1933 | Colley | 224/45 F |
| 2,539,496 | 1/1951 | Towey | 224/7 E |
| 2,796,209 | 6/1957 | Holmes | 224/7 D |
| 3,302,837 | 2/1967 | Montgomery | 224/7 D |
| 3,482,747 | 12/1969 | Jones | 224/7 D |
| 3,893,605 | 7/1975 | Mew | 224/7 D |

Primary Examiner—Louis G. Mancene
Assistant Examiner—Robert P. Swiatek
Attorney, Agent, or Firm—Krass & Young

[57] ABSTRACT

A fish stringer having a cushioned handle made of flat, flexible metal stock covered centrally with plastic, the ends of the metal stock having holes formed therein for the attachment of a plurality of independent safety-pin type clasps. A length of chain is also connected to the handle and has on its free end a safety pin type clasp which may be used to secure the stringer to a stationary object when it is used in the water, or to be connected back to the handle when the stringer is used out of the water.

2 Claims, 2 Drawing Figures

U.S. Patent    May 23, 1978    4,090,651
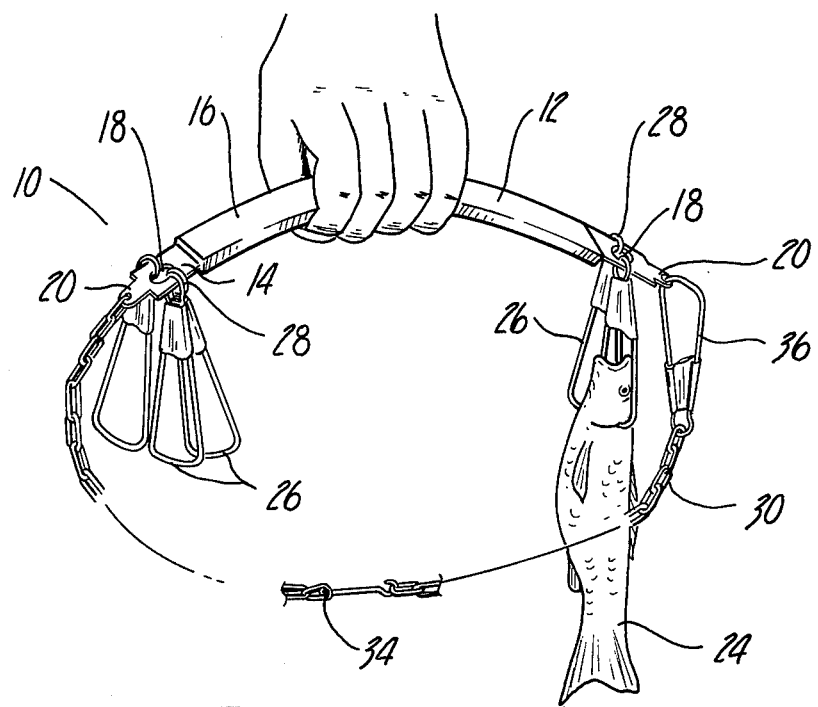
Fig-1
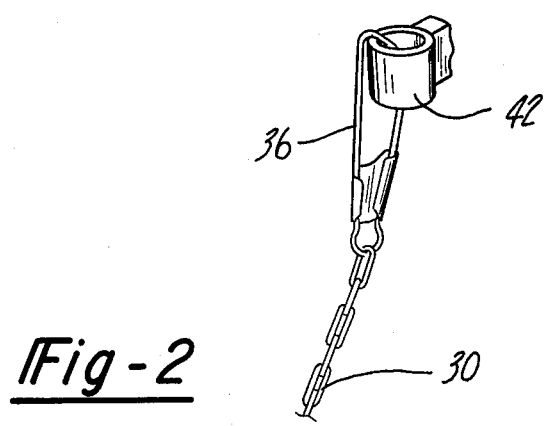
Fig-2
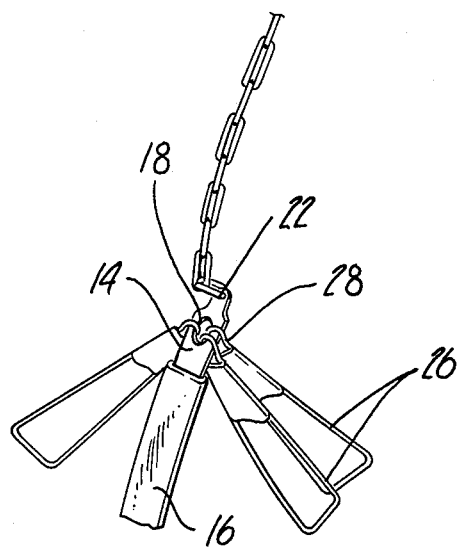

FISH STRINGER

INTRODUCTION

This invention relates to fish stringers, and particularly to a stringer having a carrying handle and an attached chain for securing the stringer to various objects.

BACKGROUND OF THE INVENTION

Fish stringers are used for securing caught fish and for carrying or handling the catch out of the water. Preferably the stringer can be used in such a fashion as to keep the caught fish in water while the fisherman continues to seek his limit for the day. Fish are generally connected to the stringer by running a single continuous line through the mouth and gill of each fish and simply stacking them up on one another.

Fish stringers that are well suited for keeping fish alive in the water are typically difficult to handle out of the water, and vice versa. Consider the device disclosed by Wickman et al, U.S. Pat. No. 1,004,324, which has a serial group of independent hooks for connecting fish, but has no handle or place near the center of gravity by which the stringer may be held. Such a stringer is unwieldy to carry with a full load of fish.

On the other hand, the device disclosed by Callender, U.S. Pat. No. 936,701 is conveniently carried by a handle, but requires that the fish be bunched together on one large circular hook. This arrangement forces each fish to move against the weight of all the other fish on the hook.

It is an objective of the present invention to provide an improved fish stringer which overcomes the limitations and disadvantages of prior art devices, is easy and convenient to use, is easily and comfortably carried, both empty and loaded, can be secured to any of a wide variety of objects, and is of low cost and facile manufacture.

SUMMARY OF THE INVENTION

A fish stringer made in accordance with the present invention is easily carried, both full and empty, and allows fish to be easily connected to the stringer, and to enjoy a substantial degree of independence so as to sustain them in the water.

Basically, the stringer comprises a flat, flexible metal strip covered centrally with cushioning material such as plastic, and having a plurality of separate hooks, preferably closable in the manner of safety pins, attached to the opposite ends thereof. In addition, a length of chain is secured to one end of the handle and carries a fastener device on its free end to permit it to be hooked to or wrapped around a stationary object while the loaded end of the stringer remains in water. These and other advantages of the invention will be set forth more fully in the following detailed description of a specific embodiment.

BRIEF DESCRIPTION OF THE DRAWINGS

FIG. 1 is a pictorial illustration of a fish stringer formed in accordance with the present invention being carried out of the water, and FIG. 2 is a pictorial illustration of the fish stringer of FIG. 1, showing it hooked to an oarlock.

DETAILED DESCRIPTION OF THE SPECIFIC EMBODIMENT

With reference to the drawing, a fish stringer formed in accordance with the present invention is shown generally at 10. The fish stringer may be used in and out of the water as is represented by the situations illustrated in FIGS. 1 and 2.

With reference to FIG. 1, fish stringer 10 comprises a body 12 which is formed of a flat band of spring steel 14 approximately 12 inches in length and covered centrally by molded vinyl 16 to form cushion. A hole 18 is formed in each of the opposite ends of the steel band 14 which project beyond the vinyl handle cushion 16. A small tab 20 is formed on at least one end and also has a hole 22 formed therein for purposes to be described.

Each of the holes 20 receives an end loop 28 of a plurality of a closable, safety-pin type hooks 26, each hook being of such size as to engage a fish 24 through the mouth and gill area in a known manner. Typically three to six hooks are secured to each end of the handle body 12, each such hook being independently operable to carry a fish.

A light-gage link chain 30 is secured to the end of the handle body having the tab 20 thereon. The other end of the chain 30 carries a closable hook 36. A swivel device 34 is preferably connected into chain 30 between the ends thereof as shown. When the fish stringer 10 is being used out of the water, as is the situation illustrated in FIG. 1, the hook 36 may be connected back to the handle 12 by engaging the hook through the aperture 22 in the opposite projecting tab 20. The chain 30 is preferably about two or three feet in length.

As shown in FIG. 2, the loaded stringer may be secured via hook 36 on the end of the chain 30 such that the fish dangle into a lake or stream to keep fresh. In the illustrated example, the stringer 10 is secured to an oarlock 42, as representative of any relatively stationary member on a boat, dock or shore, by means of the hook 36. The chain 30 extends down into the water and supports the handle 12 and any fish thereon in a submerged position. Each of the hooks 26 on the handle are relatively independent of one another in order to allow a fish connected thereto a substantial amount of free movement. The chain 30 also permits the stringer to be connected to a log or tree simply by wrapping the chain around the object and connecting it back on itself via hook 36. Thus the securement of the stringer is not dependent on the presence of any given type of hardware, but can be accomplished under almost every conceivable condition. Obviously, a rope, cable, line or the like may be substituted for the chain. Similarly, other clasps and handles may also be used.

In summary, distinct advantages of the present invention are the inclusion of a handle which allows the fish stringer to be carried easily out of the water but which does not interfere with the usefulness of the stringer when used in the water, and the provision of a securement device capable of accommodating a wide variety of circumstances.

Embodiments which vary from the specific disclosure given herein will be apparent to those having skill in the art without departing from the scope and essence of the following claims.

The embodiments of the invention in which an exclusive property or privilege is claimed are defined as follows:

1. A fish stringer comprising:

a handle portion including a flat flexible band of material having metal-like characteristics, of such length as to substantially exceed the width of a closed human hand when grasping the band at a central position;

cushioning means centrally on said band and terminating short of the opposite ends thereof so as to leave said ends of said band exposed beyond said cushioning means;

an aperture formed in each of said exposed ends of said band;

a first plurality of open loop hook devices permanently attached to one of said exposed ends through said aperture therein and having selectively operable safety pin-type closures and being of such size and shape as to hook at least a single game fish therein whereby a plurality of said game fish may be strung at said one end;

a second plurality of open loop hook devices permanently attached at the other of said exposed ends through said aperture therein and having selectively operable safety pin-type closures and being of such size and shape as to hook at least a single game fish therein whereby a plurality of said game fish may be strung at said other end;

a chain having a length substantially exceeding the length of said handle and being permanently attached to said one of said exposed ends, the unattached end of said chain having a third open loop-type hook device having a safety pin-type closure whereby the unattached end of said chain may be selectively hooked to said other end of said handle or to various objects for anchoring purposes.

2. Apparatus as defined in claim 1 further including swivel means in said chain to prevent twising thereof.

* * * * *